(12) United States Patent
Zandonadi et al.

(10) Patent No.: US 7,320,044 B1
(45) Date of Patent: Jan. 15, 2008

(54) SYSTEM, METHOD, AND COMPUTER PROGRAM PRODUCT FOR INTERRUPT SCHEDULING IN PROCESSING COMMUNICATION

(75) Inventors: Marco Zandonadi, Berkeley, CA (US); Roberto Attias, Richmond, CA (US); Akash R. Deshpande, San Jose, CA (US)

(73) Assignee: ARC International I.P., Inc., San Jose, CA (US)

( * ) Notice: Subject to any disclaimer, the term of this patent is extended or adjusted under 35 U.S.C. 154(b) by 1008 days.

(21) Appl. No.: 10/371,681

(22) Filed: Feb. 20, 2003

Related U.S. Application Data

(60) Provisional application No. 60/359,453, filed on Feb. 22, 2002, provisional application No. 60/376,824, filed on Apr. 29, 2002, provisional application No. 60/432,778, filed on Dec. 11, 2002, provisional application No. 60/432,757, filed on Dec. 11, 2002, provisional application No. 60/432,954, filed on Dec. 11, 2002, provisional application No. 60/432,928, filed on Dec. 11, 2002, provisional application No. 60/432,872, filed on Dec. 11, 2002, provisional application No. 60/432,785, filed on Dec. 11, 2002, provisional application No. 60/433,348, filed on Dec. 12, 2002.

(51) Int. Cl.
*G06F 13/24* (2006.01)
*G06F 9/54* (2006.01)
*G06F 9/48* (2006.01)

(52) U.S. Cl. ............... 710/261; 710/262; 710/266; 710/268; 710/6; 710/48; 719/313; 718/108; 718/102; 711/167; 711/100

(58) Field of Classification Search ........ 710/260–269, 710/6, 48; 719/310–332; 718/108, 102; 711/167, 100
See application file for complete search history.

(56) References Cited

U.S. PATENT DOCUMENTS

| | | | |
|---|---|---|---|
| 4,800,521 A | 1/1989 | Carter et al. | |
| 5,247,677 A | 9/1993 | Welland et al. | |
| 5,260,868 A | 11/1993 | Gupta et al. | |
| 5,301,312 A | 4/1994 | Christopher et al. | |
| 5,386,568 A * | 1/1995 | Wold et al. | .............. 717/162 |
| 5,465,335 A | 11/1995 | Anderson | |
| 5,530,879 A | 6/1996 | Crump et al. | |

(Continued)

OTHER PUBLICATIONS

Deshpande, et al., "The Shift Programming Language for Dynamic Networks of Hybrid Automata", *IEEE Transactions on Automatic Control*, Apr. 1998, 43(4): 584-587.

(Continued)

*Primary Examiner*—Lewis A. Bullock, Jr.
(74) *Attorney, Agent, or Firm*—Perkins Coie LLP

(57) ABSTRACT

Method, system, apparatus and computer program product for interrupt scheduling in processing communication. In one embodiment the method includes: a sending computer program and a receiving computer program, coupling at least one registered signal identifier and a corresponding registered signal function with said receiving computer program; sending a communication including a request signal identifier by said sending computer program to said receiving computer program; receiving said communication sent at (B) by said receiving computer program; and performing said corresponding registered signal function without context switching of said receiving computer program if said request signal identifier received is coupled with said registered signal identifier. A system, router, computer program and computer program product are also disclosed.

33 Claims, 7 Drawing Sheets

U.S. PATENT DOCUMENTS

| | | |
|---|---|---|
| 5,619,409 A | 4/1997 | Schultz et al. |
| 5,636,124 A | 6/1997 | Rischar et al. |
| 5,640,563 A | 6/1997 | Carmon |
| 5,701,481 A | 12/1997 | Hosaka et al. |
| 5,781,187 A | 7/1998 | Gephardt et al. |
| 5,872,909 A | 2/1999 | Wilner et al. |
| 5,938,708 A | 8/1999 | Wallace et al. |
| 5,944,840 A | 8/1999 | Lever |
| 6,105,048 A | 8/2000 | He |
| 6,279,108 B1 | 8/2001 | Squires et al. |
| 6,341,303 B1 | 1/2002 | Rhee et al. |
| 6,349,321 B1 | 2/2002 | Katayama |
| 6,359,622 B1 | 3/2002 | Hayes-Roth |
| 6,385,637 B1 | 5/2002 | Peters et al. |
| 6,385,638 B1 | 5/2002 | Baker-Harvey |
| 6,425,091 B1 | 7/2002 | Yang et al. |
| 6,438,573 B1 | 8/2002 | Nilsen |
| 6,738,846 B1 * | 5/2004 | Slaughter et al. ........... 710/260 |
| 6,823,413 B2 * | 11/2004 | Fujiki .......................... 710/260 |
| 6,922,834 B1 * | 7/2005 | Okamura .................... 719/310 |
| 7,051,333 B1 * | 5/2006 | Nylander et al. ........... 719/310 |
| 2002/0016813 A1 | 2/2002 | Woods et al. |

OTHER PUBLICATIONS

Deshpande, et al., "Viable Control of Hybrid Systems", *Hybrid Systems II*, Springer 1995.

Interrupt Driven Task Scheduler for Systems, *IBM Technical Disclosure Bulletin*, Mar. 1992, US.

Introduction to Kernel Threads (This document is part of the HP-UX 11.x Software Transition Kit) (1997).

\* cited by examiner

SYSTEM, METHOD, AND COMPUTER PROGRAM PRODUCT FOR INTERRUPT SCHEDULING IN PROCESSING COMMUNICATION

CROSS-REFERENCES TO RELATED APPLICATIONS

This application claims benefit of priority under 35 U.S.C. 119(e) and/or 35 U.S.C. 120 to:

U.S. Provisional Patent Application No. 60/359,453, entitled, "SYSTEM, METHOD, OPERATING MODEL AND COMPUTER PROGRAM PRODUCT FOR OPERATING SYSTEM FUNCTIONS FOR NETWORK PROCESSING", filed Feb. 22, 2002, Marco Zandonadi, et al. inventors;

U.S. Provisional Application, No. 60/376,824, entitled, "SYSTEM, METHOD, OPERATING MODEL AND COMPUTER PROGRAM PRODUCT FOR IMPROVING APPLICATION PERFORMANCE UTILIZING NETWORK PROCESSORS", filed Apr. 29, 2002, Mandeep S. Baines, et al., inventors;

U.S. Provisional Patent Application No. 60/432,778, entitled, "SYSTEM, METHOD, AND COMPUTER PROGRAM PRODUCT FOR MEMORY MANAGEMENT", filed Dec. 11, 2002, Marco Zandonadi, et al. inventors;

U.S. Provisional Patent Application No. 60/432,757, entitled, "SYSTEM, METHOD, AND COMPUTER PROGRAM PRODUCT FOR INTERRUPT SCHEDULING IN PROCESSING COMMUNICATION", filed Dec. 11, 2002, Marco Zandonadi, et al. inventors;

U.S. Provisional Patent Application No. 60/432,954, entitled, "SYSTEM, METHOD, AND COMPUTER PROGRAM PRODUCT FOR PROCESSING REFLECTIVE S TATE MACHINES", filed Dec. 11, 2002, Marco Zandonadi, et al. inventors;

U.S. Provisional Patent Application No. 60/432,928, entitled, "SYSTEM, METHOD, AND COMPUTER PROGRAM PRODUCT FOR GENERATING AN INTERFACE", filed Dec. 11, 2002, Marco Zandonadi, et al. inventors;

U.S. Provisional Patent Application No. 60/432,872, entitled, "SYSTEM, METHOD, AND COMPUTER PROGRAM PRODUCT FOR TEMPLATE-BASED MULTI-PROTOCOL MESSAGING BETWEEN SYSTEMS", filed Dec. 11, 2002, Marco Zandonadi, et al. inventors;

U.S. Provisional Application, No. 60/432,785, entitled, "SYSTEM, METHOD, AND COMPUTER PROGRAM PRODUCT FOR SHARED MEMORY QUEUE", filed Dec. 11, 2002, Mandeep S. Baines, et al., inventors; and U.S. Provisional Application, No. 60/433,348, entitled, "SYSTEM, METHOD AND COMPUTER PROGRAM PRODUCT", filed Dec. 12, 2002, Akash R. Deshpande, et al., inventors; each of which applications are incorporated by reference herein.

Other related U.S. Patent Applications are co-pending U.S. patent application Ser. No. 10/371,830, now U.S. Pat. No. 6,985,976 which issued Jan. 10, 2006, entitled, "SYSTEM, METHOD, AND COMPUTER PROGRAM PRODUCT FOR MEMORY MANAGEMENT FOR DEFINING CLASS LISTS AND NODE LISTS FOR ALLOCATION AND DEALLOCATION OF MEMORY BLOCKS", filed Feb. 20, 2003, Marco Zandonadi, et al. inventors; and co-pending U.S. patent application No. 10/371,829, now U.S. Pat. No. 7,039,772 which issued May 2, 2006, entitled, "SYSTEM, METHOD, AND COMPUTER PROGRAM PRODUCT FOR PROCESSING REFLECTIVE STATE MACHINES", filed Feb. 20, 2003, Marco Zandonadi, et al. inventors; each of which is hereby incorporated by reference.

FIELD OF THE INVENTION

The present invention relates to the field of operating systems and more particularly to interrupt scheduling, interrupt processing, and/or defining and redefining interrupts.

BACKGROUND OF THE INVENTION

Many techniques for supporting network processing are known. Such techniques include generic memory management, interrupt scheduling, state machines, computer program code generation, and multi-protocol interfaces. The foundations of such threads are generally understood but in many cases their practical realization has fallen short of the desired results.

Today many computer programs are intended to be processed in multi-processor and/or multi-threaded environments. The term processing is typically associated with executing a thread (such as a computer program or set of computer program instructions) and is generally considered to be an operating system concept that may include the computer program being executed and additional information such as specific operating system information. In some computing environments executing a computer program creates a new thread to identify, support, and control execution of the computer program. Many operating systems, such as UNIX, are capable of running many threads at the same time using either a single processor and/or multiple processors. Multiple processors can perform tasks in parallel with one another, that is, a processor can execute multiple computer programs interactively, and/or execute multiple copies of the same computer program interactively. The advantages of such an environment includes a more efficient and faster execution of computer programs and the ability of a single computer to perform multiple tasks concurrently or in parallel.

A multiprocessor system, such as for example a network processor system, may include a number of system-on-chip components, that may be optimized for specific processing, such as for example optimized for processing packet input-output and packet modification. A packet may include a variety of information, including for example, a data item, a packet destination address, and a packet sender address. Support for processing a high volume of packets may be provided by a multiprocessor system that requires improvements in common operating system functions. In part due to the high volume of packets, a multiprocessor system is particularly susceptible to inefficient processing techniques that may otherwise be effective with a single processor system.

Computer program instructions are typically processed by a CPU within one or more thread contexts, such as for example a regular context and a limited context. The CPU can execute a variety of different types of computer program instructions. The execution of these different types of computer program instructions may be limited to a regular context and/or a limited context. A set of computer program instructions may be coupled with either a regular context or a limited context. If the set of computer program instructions are coupled with a regular context then the CPU may execute those computer program instructions from the set of computer program instructions that correspond with the regular context. If the set of computer program instructions are coupled with a limited context then the CPU may execute those computer program instructions from the set of computer program instructions that are coupled with the limited context. According to one embodiment of the present invention the regular context may be referred to as a so-called "user mode", and the limited context may be referred to as a so-called "kernel mode".

A regular context is typically coupled with the computer program instructions of a user application, while the limited context is typically coupled with the computer program instructions of an interrupt. The regular context typically support processing most computer program instructions. The regular context is typically used for most processing activities, including activities that may block a caller, such as for example semaphores, memory allocation, freeing allocated memory, and/or input and output processing.

A limited context is typically coupled with the computer program instructions of privileged computer programs, such as for example scheduling computer programs and interrupt service routines. The limited context typically restricts some processing activities, such as for example not allowing processing activities that may block a caller, such as semaphores, memory allocation, freeing allocated memory, and/or input and output processing. The limited context may also supports processing additional computer program instructions, such as for example additional computer program instructions for scheduling and interrupt service routines.

Most processing typically occurs in the regular context, while processing of interrupts typically occurs in the limited context, which limits the processing activities that may be performed. Processing interrupts in conventional operating system provides that corresponding interrupt service routines (ISR) are processed in a limited context and restrict the use of many processing activities and/or computer system services typically available in the regular context. The restrictions of a limited context thereby protects the system against a variety of potential problems, such as deadlock scenarios, and scheduling conflicts. A potential deadlock scenario may include two or more threads that are attempting to obtain exclusive access to the same shared resource, wherein the threads may obtain partial access. Consequentially, neither thread obtains exclusive access and the threads are deadlocked. A potential scheduling conflicts may include the inability to schedule individual threads because the active thread may be performing a processing activity that prevents scheduling, such as a semaphore. Unfortunately, this type of processing activity is often required to effectively implement ISRs.

Further, ISRs may be used in scheduling threads for processing on one or more processors. In a conventional multiprocessing system an ISR typically interrupts a thread without regard to the specific processing activity currently being performed. Ideally, the thread may be executing in an interruptible state or in an uninterruptible state and the thread would only be interrupted while the thread is in the interruptible state. Unfortunately, ISR processing does not take into consideration whether a thread is in an interruptible state or an uninterruptible state.

Additionally, the processing associated with an ISR is static in nature such that an identical function is performed for a given signal or interrupt. Ideally, the functionality associated with an ISR would be dynamically configured based on information available to a multiprocessor system. Unfortunately, conventional interrupt processing is statically defined and can not be dynamically defined or redefined.

Therefore conventional processing of interrupts is not efficient and there remains a need for a system, method, computer program, and computer program product for interrupt scheduling in processing communications. What is needed is an ability to processing signals, that may correspond with interrupts, within a regular context to improve the flexibility of processing associated with both signals and interrupts. Further, a need exists for an ability to further improve the integrity of processing associated with a given thread such that interrupts are preferably processed while the thread is in an interruptible state, supporting dynamically defining and redefining interrupts, and that overcomes the above and other disadvantages of known interrupt processing.

BRIEF SUMMARY OF THE INVENTION

In summary, one aspect of the present invention is directed to a method, system, apparatus and computer program product for interrupt scheduling in processing communication. In one embodiment the method includes: a sending computer program and a receiving computer program, coupling at least one registered signal identifier and a corresponding registered signal function with said receiving computer program; sending a communication including a request signal identifier by said sending computer program to said receiving computer program; receiving said communication sent at (B) by said receiving computer program; and performing said corresponding registered signal function without context switching of said receiving computer program if said request signal identifier received is coupled with said registered signal identifier. A system, router, computer program and computer program product are also disclosed.

Another aspect of the present invention is directed to a method and system to support interrupt scheduling and may include scheduling interrupts based on the state of a thread. The method includes a receiving thread coupled with an interface. Interrupts may be processed within a regular context and/or limited context. A state corresponding with the receiving thread may include an interruptible state and an uninterruptible state. A signal and corresponding function may be registered with the receiving thread. Interrupt functions may be redefined. The receiving thread may be interrupted while in an interruptible state to perform the processing associated with a received signal and may process the corresponding function in the regular context.

The system, method, and computer program product for interrupt scheduling in processing communication of the present invention has other features and advantages which will be apparent from or are set forth in more detail in the accompanying drawings, which are incorporated in and form a part of this specification, and the following Detailed Description, which together serve to explain the principles of the present invention.

DETAILED DESCRIPTION

Reference will now be made in detail to embodiments of the invention, examples of which are illustrated in the accompanying drawings. While the invention will be described in conjunction with several embodiments, it will be understood that they are not intended to limit the invention to those embodiments. On the contrary, the invention is intended to cover alternatives, modifications and equivalents, which may be included within the spirit and scope of the invention as defined by the appended claims.

Several of the inventive systems, methods, and computer program, and computer program products for interrupt scheduling in processing communication may be implemented for use with network processor (NP) platforms, such as for example a Teja Network Processor platform. References to "Teja" are references to particular embodiments, computer programming code segments, or other references to subject matter developed by Teja Technologies of San Jose, Calif..

According to one embodiment, the present invention provides innovative operating system techniques for network processing designed and implemented for network processors. In many conventional implementations, network processors are multiprocessor system-on-chip components optimized for packet input-output and modification. Network processors typically include a tightly coupled multiprocessor architecture. Advantageously, the present invention is capable of enhancing packet throughput and minimizing latency through the use of novel computer program software techniques for common operating system functions and associated architectures and operating system methodologies, and associated architectures and operating system methodologies, according to an embodiment of the present invention.

Figure 1:
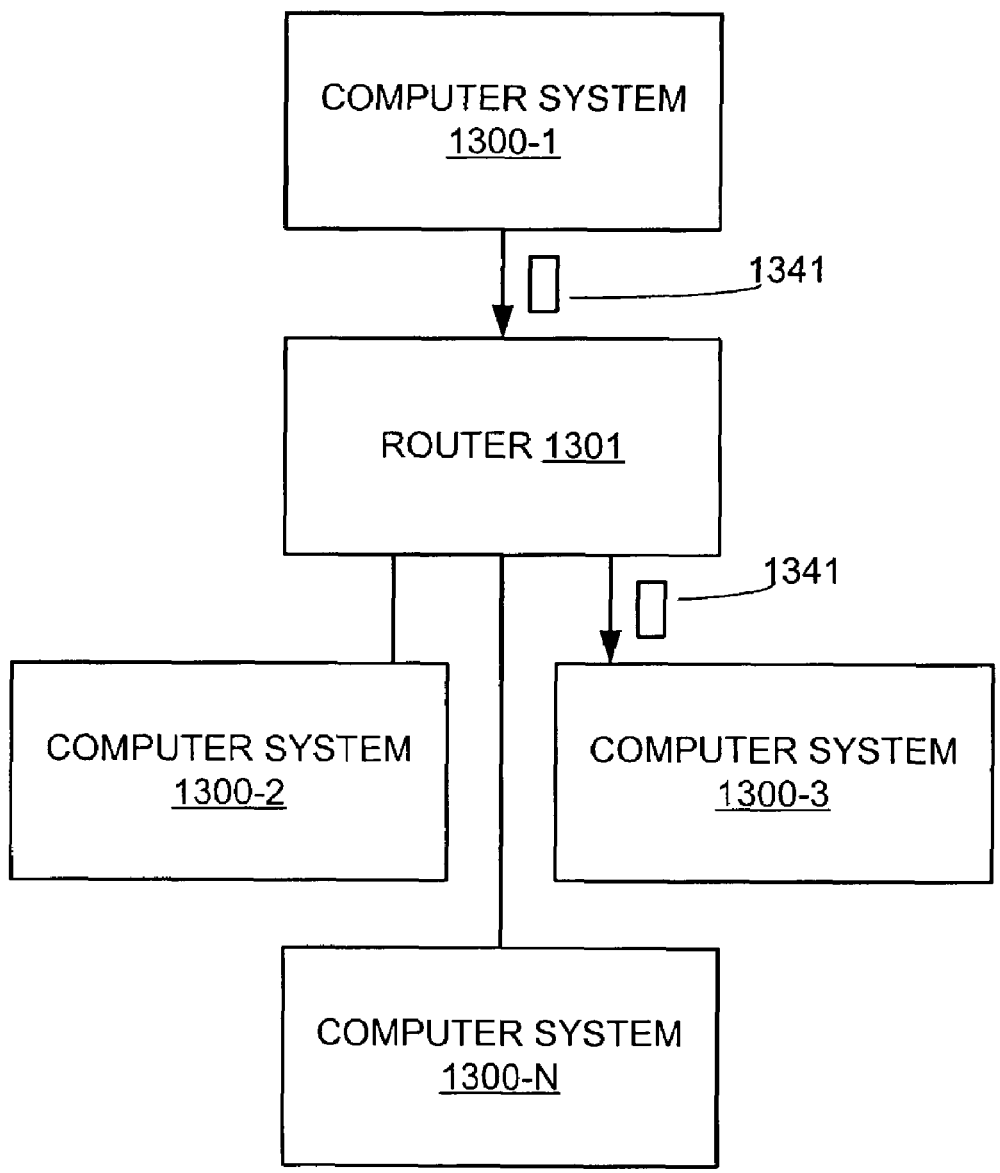
FIG. 1 generally illustrates a router receiving and forwarding a packet, according to the prior art.

Turning now to the drawings, wherein like components are designated by like reference numerals throughout the various figures, attention is directed to FIG. 1 illustrating a conventional router 1301 coupled between multiple computer systems 1300-x (for example, computer systems 1300-1, 1300-2, 1300-3, . . . , 1300-N). Communication between multiple computers systems 1300-x may use the router 1301 to route a packet of information 1341, or more simply a packet 1341, between computer systems. As illustrated, computer system 1300-1 may send a packet 1341 to the computer system 1300-3 through the router 1301. The router 1301 typically receives the packet 1341, analyzes the packet to determine where to forward the packet, and then, as illustrated, forwards the packet to the destination computer system 1300-3.

Figure 2:
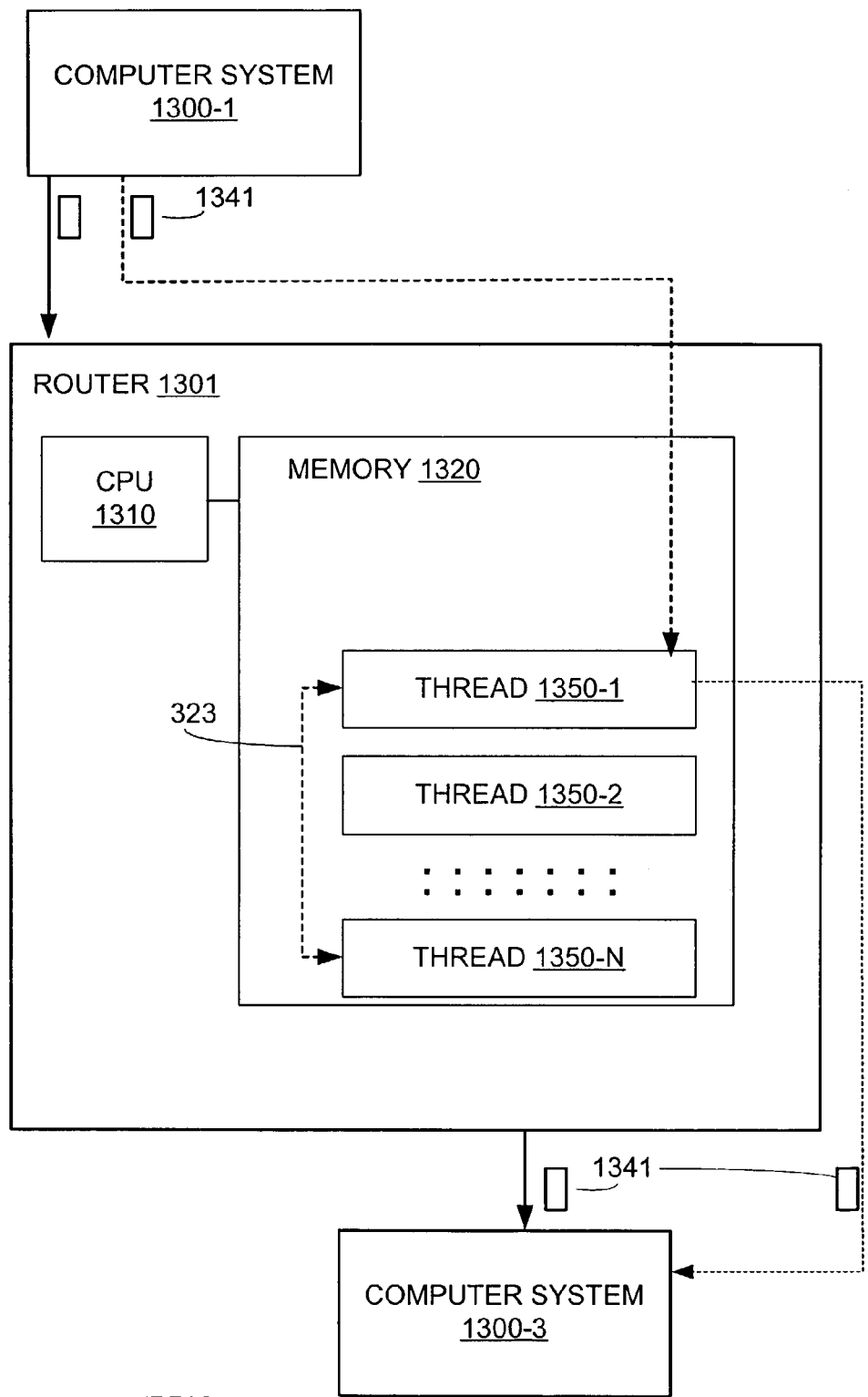
FIG. 2 generally illustrates a router including a CPU and memory for receiving and forwarding a packet, according to the prior art.

As illustrated in FIG. 2, the conventional router 1301 may include a CPU 1310 coupled with memory 1320. The memory 1320 may be coupled with one or more thread 1350-x (for example, thread 1350-1, 1350-2, . . . , 1350-N). Each of the threads may communicate with another thread, such as for example thread 1350-1 may communicate with thread 1350-2. A thread may include computer program instructions for performing a particular activity or function, such as for example a function for receiving packet 1341, determining the destination address of the received packet 1341, and forwarding the packet 1341 to the determined destination address. The CPU 1310 may execute computer program instructions associated with each thread 1350-x. Further, communication between threads is occasionally supported using an interrupt communication link 323, such as for example communication between threads 1350-1 and 1350-N. Other of the threads 1350-x may be similarly coupled with communication links. The interrupt communication link 323 may include software signals, interrupts, and/or other types of interrupts. Communication may be provided through the use of interrupts and/or software signals. Unfortunately, interrupt handlers and signal handlers are typically executed in a limited context and interrupt current processing asynchronously without concern for the activity being performed by the interrupted thread.

Figure 3:
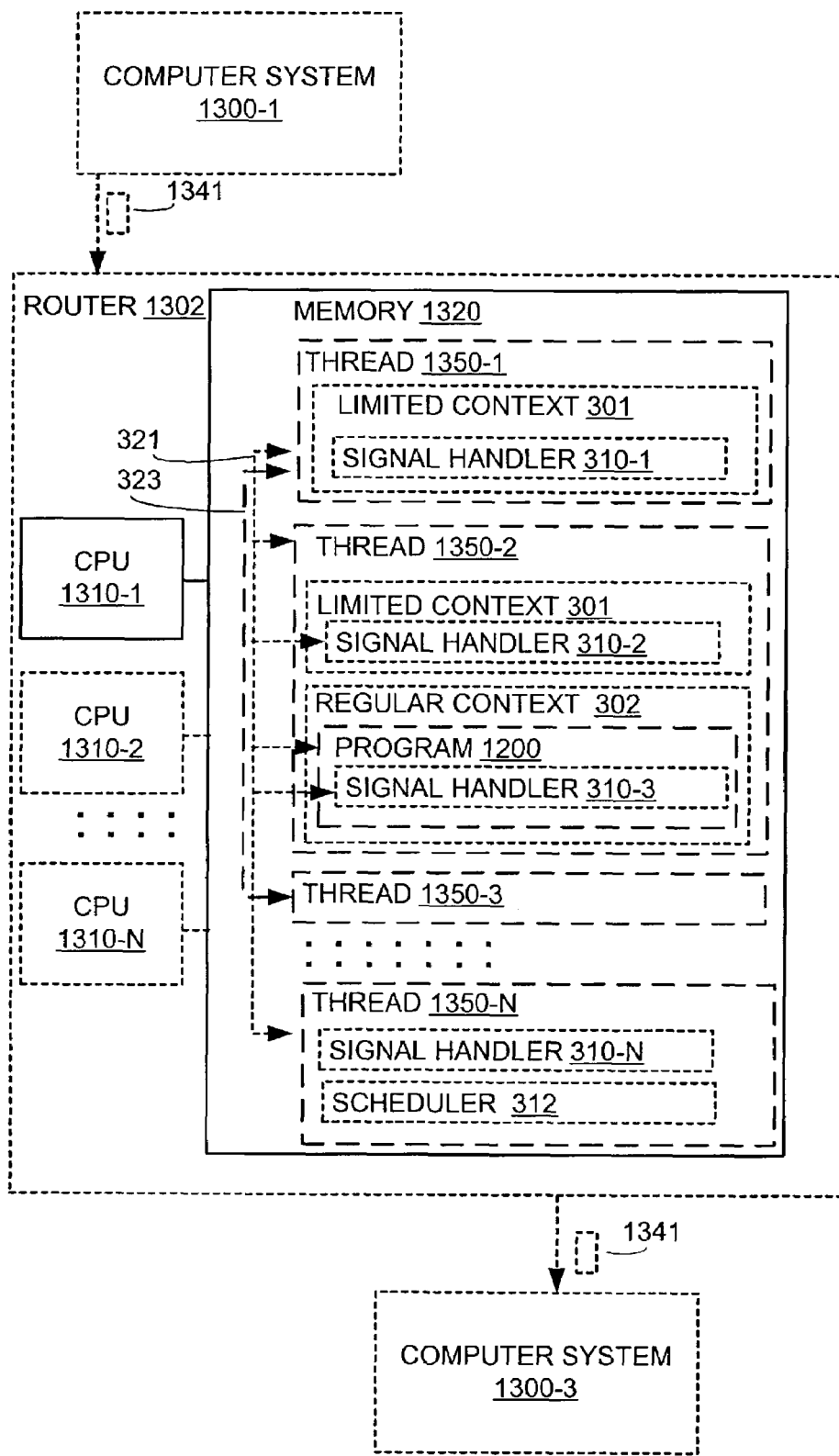
FIG. 3 generally illustrates a router including a CPU and memory for receiving and forwarding a packet with communication between threads, according to an embodiment of the present invention.

Advantageously, the present invention enhances performance by supporting communication between threads and/or computer and thereby provides a more efficient utilization of resources. FIG. 3 illustrates an innovative router, generally designated 1302. The innovative router 1302 may include one or more computer programs 1200 coupled with one or more threads 1350-x. A computer program 1200 may be used to receive the packet 1341, communicate with other threads in support of processing the packet 1341, and/or to send a corresponding packet 1341.

Communication between a sender and a receiver may be supported by a communication link 321 and/or an interrupt communication link 323. According to one embodiment, a sender may be either a computer program 1200 or a thread 1350-x, and a receiver may be either a computer program 1200 or a thread 1350-x. A received signal and/or interrupt may be processed within a limited context 301, a regular context 302, or by a combination or hybrid of the two thereof. The signal handler 310-x, such as for example the signal handler 310-1, 310-2, 310-3, . . . , 310-N, can process the received signal according to one or more thread context. Advantageously, processing an interrupt is not unnecessarily restricted within a limited context 301 according to the present invention.

According to one embodiment, communication between threads 1350-x may include the use interrupts and/or operating system native software signals. Communication between threads 1350-x may be provided in part through the use of accessible function calls, such as, for example without limitation, a common operating system kill function and/or proprietary development environment signals associated with a given runtime environment (such as for example, the Teja environment).

According to an embodiment of the present invention, processing interrupts and/or signals may be performed in a regular context 302, which allows the use of system functions that may optionally block a caller, such as semaphores, memory allocation, freeing allocated memory, or input and output processing. Advantageously, interrupt processing is not unnecessarily restricted. Consequently, a variety of functionality may be effectively used in the implementation, scheduling, and processing of interrupts. Further, this innovative communication approach can facilitate communication and improve performance of the network processor 1310-x by allowing a thread 1350-x to complete an activity before proceeding with processing a communication, which can leave the thread 1350-x in an unstable state.

Additionally, a interrupt scheduler 312 may be used to coordinate the processing of one or more threads 1350-x. A thread such as thread 1350-3 may include a interrupt scheduling function 312. Each thread 1350-x is coupled with a interrupt scheduler 312 may include a signal handler 310-x for receiving and processing signals sent by the interrupt scheduler 312. Consequently, scheduling according to an embodiment of the present invention provides a unique technique for scheduling interrupt service routines and signal handlers, without unnecessarily interrupting a thread without regard to processing that may be currently underway by the thread.

Figure 4:
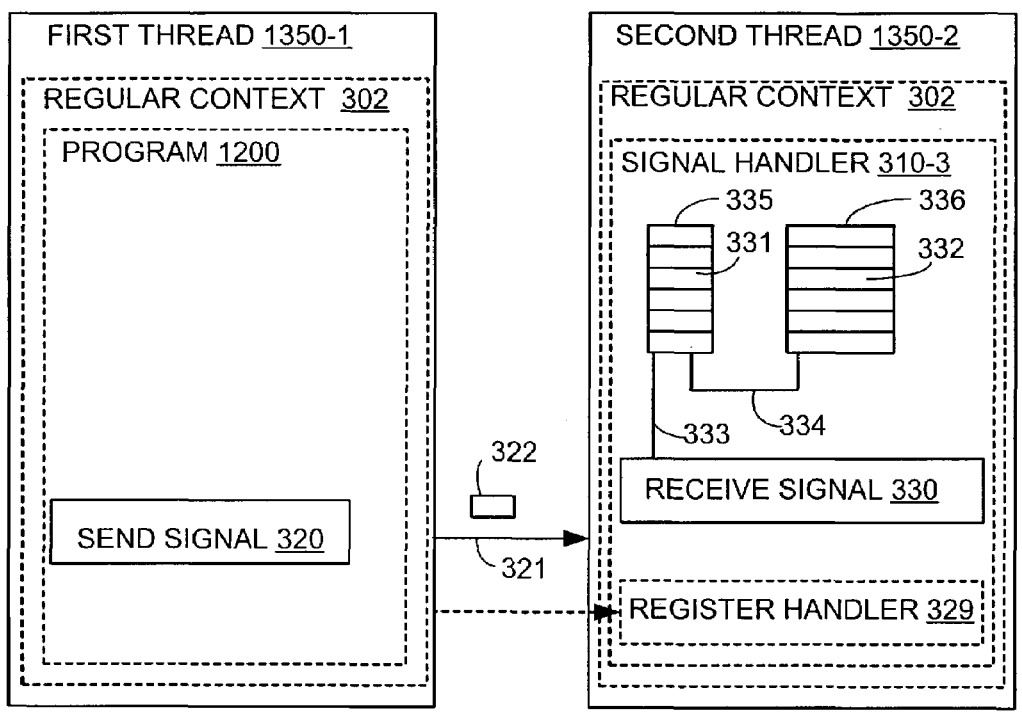
FIG. 4 generally illustrates interrupt scheduling and processing, according to an embodiment of the present invention.

FIG. 4 generally illustrates interrupt scheduling and processing between threads, including a first thread 1350-1, a second thread 1350-2, and a communication link 321. The receive signal capability 330 may interact with the set of registered signals 335 according to a link 333. Each signal 331 identified in the set of registered signals 335 is typically coupled 334 with a registered signal function 332 identified in a set of functions 336. When the signal is received the corresponding function may be processed in the context of the second thread 1350-2. Advantageously, the present invention may perform the processing associated with a communication signal 322 within the regular context.

According to one embodiment of the present invention, the first thread 1350-1 uses a send signal capability 320 to send a signal using the communication link 321 to the second thread 1350-2, which uses a receive signal capability 330 to receive the signal. The second thread 1350-2 may be coupled with the set of registered signals 335 and the corresponding set of signal handlers or functions 336. The communication signal 322 received by the second thread 1350-2 may correspond with a registered signal 331 in the set of registered signals 335. The registered signal 331 may also be coupled with a corresponding registered signal function 332 in the set of functions 336. The corresponding registered signal function 332 is processed in response to receiving the communication signal 322.

Typically, a thread 1350-x may operate in an interruptible state, an uninterruptible state, and periodically or aperiodically switching between the two states. Communication between a scheduler thread, such as for example thread 1350-1, and the second thread 1350-2 may be supported by sending a communication signal 322 from a scheduler thread 1350-1 to a given second thread 1350-2. While the second thread 1350-2 is in an uninterruptible state the signal 322 is not processed. An implementation of the communication link 321 may support storing one or more signal 322 until the second thread 1350-2 is ready to receive the signal 322. Alternatively, the receive signal 330 may support storing a signal 322 until the thread 1350-2 is in an interruptible state and capable of processing the signal. Processing a so-called wait state represents one such interruptible state. Once the thread is in an interruptible state the signal may be processed as described above.

According to one embodiment, a signal and corresponding function may be registered with a thread 1350-x by calling a register handle function 329 coupled with the thread 1350-x and/or signal handler 310-x, to add or update one or more of the signals 331 and/or corresponding registered signal function 332. As a result of the register handle function 329 a signal 331 may be added to the set of registered signals 335 and a corresponding registered signal function 332 may be added to the set of functions at 336. According to one embodiment, the signal 331 may be correlated with a registered signal function 332 using a common index. Registering a previously registered signal 331 may be used to update or overwrite the corresponding registered signal function 332. According to another embodiment, an example implementation of the register handle function 329 is provided by the Teja Teja_register_interrupt_handler() function. According to one embodiment, the register interrupt handler function may be used to store the signature code for the function handler in a corresponding set of respective arrays that may be established. There respective arrays may be used by a Teja thread to identify the signature code of a function and the corresponding handler function.

An interface may be provided to communicate with a thread 1350-x to add a signal code 331 to the set of signals 335, and to add a corresponding function 332 to the list of registered signal functions 336. Signals may be registered with the signal handler 310-x, which may be executed in response to the receive signal 330. The signal handler 310-x may effectively redirect the processing normally associated with the signal handler to be scheduled and processed according to the functionality of the thread 1350-x. In one embodiment the communication link 321 and the communication signal 322 may be used to add or update a signal code 331 and/or function 332. An implementation, according to one embodiment, provides a register_interrupt_handler() function, such as for example the Teja_register_interrupt_handler(). According to one embodiment the register interrupt function is operative to translate an operating system signal code. For example, without limitation, if a signature code is a valid operating system signal code, then the register interrupt handler function may also register the signal with the operating system. Subsequently, if the interrupt occurs then the original interrupt handler is not executed. Instead a substituted interrupt handler is executed to translate the interrupt into a second interrupt which typically includes a signature code. The second interrupt may be executed by sending the signature code to a Teja thread to trigger a function corresponding to the signature code. Here the corresponding function may be executed synchronously within the Teja thread. The corresponding function may also be executed in the normal context, as opposed to a limited context that is typically associated to the execution of an interrupt function.

Any of a variety of known communication implementations may be used. According one embodiment, a communication signal 322 may be sent by the first thread 1350-x using a so-called socket implementation that may be used to provide bidirectional communication between two threads, such as for example threads 1350-1 and 1350-2. Accordingly, a first thread 1350-1 may open a socket to create a channel that may include a receiving end, a sending end, and a specific thread for sending a signal. Here, the socket provides a mechanism for creating a bi-directional virtual connection between the two threads. Correspondingly, the sender thread 1350-1 may read a second position of the destination of a socket signal array which contains a file descriptor of the communication channel to be used on the sending end. The sender thread 1350-1 then writes a signal 331 to the channel. The channel may buffer the signal 331 until it is received at 330. The receiver thread 1350-2 reads from the first position of the socket signal array, which contains the file descriptor of the communication channel used on the receiving end to receive the signal 331. One such implementation is a TejaThread_send_signal() function that may use such a virtual connection between threads to send a communication.

According to one embodiment, a thread 1350-x may send a communication signal 322 according to a particular implementation of the receive signal 330. A scheduler 312 may provide each thread 1350-x with a common form of communication and/or require each thread 1350-x to support one or more forms of communication. An implementation of the communication link 321 may use a pair of so-called sockets, which are known in the art.

Updating the functionality corresponding with a signal or interrupt is supported by the present invention. Advantageously, the functionality may be updated dynamically to support changes as the thread or multiple threads execute over a period of time. Dynamically updating may be accomplished by sending communication signal 322 coupled with a signal code 331 and/or a corresponding function 332. The receive signal 330 can use the signal code 331 and/or the corresponding function 332 to dynamically update the set of signals 335 and/or to update the corresponding functions 336. Alternatively, the register handle 329 can use the signal code 331 and/or the corresponding function 332 to dynamically update the set of signals 335 and/or to update the corresponding functions 336.

In one embodiment, the communication link 321 includes the use of sockets, where the second thread 1350-x can identify the address of the socket and write into the input side of the socket, and the first thread 1350-1 can read from the output side of the socket.

Figure 5:
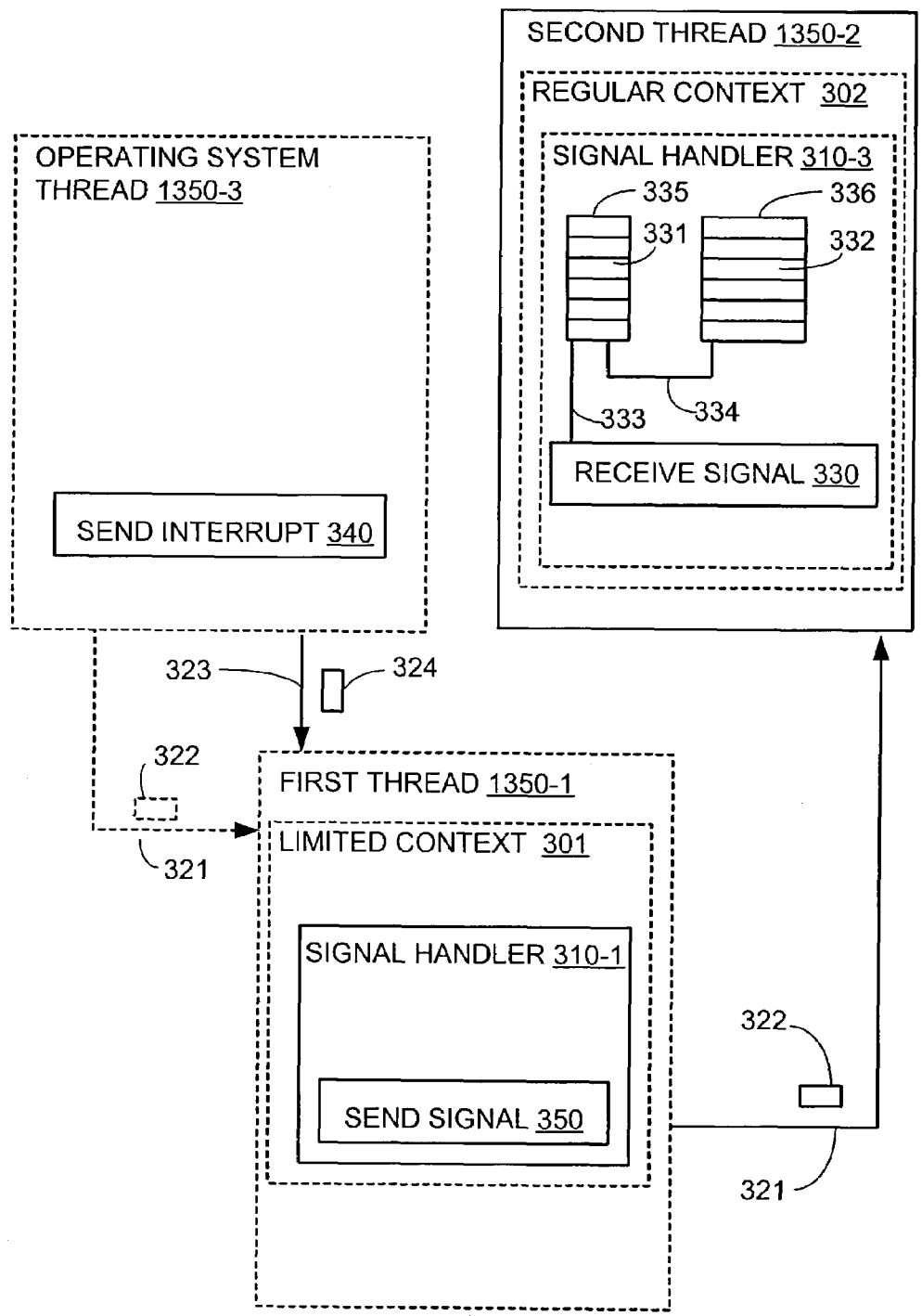
FIG. 5 generally illustrates interrupt scheduling and processing using a signal handler, according to an embodiment of the present invention.

FIG. 5 generally illustrates interrupt scheduling and processing using a signal handler 310-x, according to an embodiment of the present invention. Typically the operating system thread 1350-3 may include a capability of sending an interrupt 340, or an operating system signal 324. The interrupt 340 may be sent by a common operating system function such as for example a so-called "kill(thread identifier 1350-2)" command that directs the operating system to send a signal to the identified thread. Accordingly, a first thread 1350-1 may receive the signal 324 using an interrupt communication link 323 from an operating system thread 1350-3. According to another embodiment of the present invention, the first thread 1350-1 may receive signal 322 using the communication link 321. The receive signal may be processed in a limited context 301 using a signal handler 310-1 and/or first thread 1350-1. Unfortunately, the signal handler 310-1 typically processes the operating system signal 324 in a limited context 301 and without regard to the present state of the corresponding thread 1350-2.

Advantageously, the present invention provides that the operating system signal 324 may be translated into the signal 322 for processing in a regular context 302. The signal handler 310-1 may be executed by an operating system when an operating system signal 324 is received. The signal handler 310-1 with a send signal capability 350 may be used to send a communication signal 322 representing the operating system signal 324. The corresponding communication signal 322 may be sent to a corresponding thread 1350-2 for processing. According to one embodiment, the thread 1350-2 may be given an opportunity to finish processing the current activity and then process the signal 322, such as for example terminating the thread 1350-2 gracefully. Advantageously, work being performed by the thread 1350-2 may be completed making the overall system more efficient.

An example implementation of communication between a first thread 1350-x and a second thread 1350-x may include the use of a so-called process_send_signal as known in the art. An implementation, according to one embodiment, is provided by a Teja specific example including a so-called TejaThread_send_signal() function. The send signal function may include a thread identification parameter and a signal code identification parameter. The thread send signal function may send the signal code to the thread identified by the thread identifier. According to one implementation, the signal code is written to a computer program socket coupled with the intended destination thread. The destination thread may then receive the signal code during an interruptible state.

Advantageously, when an operating system thread such as 1350-3 sends an operating system signal 324 to a signal handler 310-1. The operating system signal 324 may be translated into the communication signal 322, which may be sent to the second thread 1350-2. Consequently, the operating system signal 324 may be processed by the second thread 1350-2, and may also be processed within a regular context 302. Advantageously, the communication signal 322 may be processed as described above for communication between two threads. Alternatively, the signal handler 310-1 may perform either an initial function that is similar to the function of an interrupt handler and/or a function of translating the operating system signal 324 into a communication signal 322.

Figure 6:
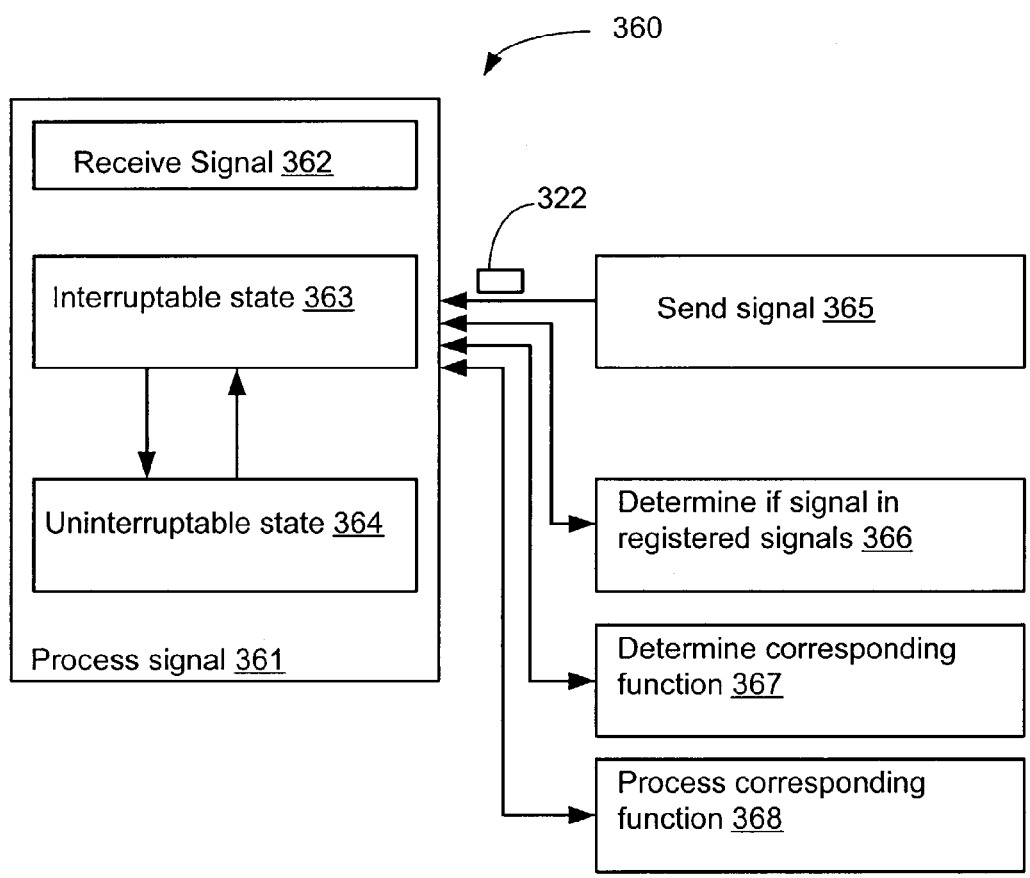
FIG. 6 generally illustrates a method for processing a signal, according to an embodiment of the present invention.

FIG. 6 generally illustrates a method 360 for supporting communication between threads 1350-x according to an embodiment of the present invention. A signal may be sent at 365, and processed at 361. The signal 322 may be received at 362. Processing a received signal may depend on the current state of a thread 1350-x. As illustrated the state may include an interruptible state at 363, an uninterruptible state at 364, and the current state may switch back and forth between the two states. Any of a variety of other states may also be used and the switching may be accomplished by switching back and forth between the group of states. Preferably the duration of processing associated with the uninterruptible state 364 is limited to a short duration. A short duration may typically be between about 1 ms and 1000 ms, and more usually between about 10 ms and 100 ms. Shorter durations are more typical, such as for example to support scheduling individual threads 1350-x. These durations are merely typical or usual ranges and the invention is not itself limited to any particular range.

According to one embodiment of the present invention, a thread 1350-x may receive signal 322 at 362 when the thread 1350-x is in an interruptible state at 363. A second thread 1350-x or a signal handler 310-x may initiate the communication signal 322. When a communication signal 322 is received, the thread may determine if the received signal is coupled to a registered signal 331 defined in the set of registered signals 335 at 366. If the received signal is coupled with a registered signal 331 then the corresponding registered signal function 332 may be determined from the set of functions 336 at 367. The function may then be processed within the regular context 302 and/or limited context 301 of the process at 360. Preferably, the function 332 is processed within the regular context 301.

According to one embodiment of the present invention, the communication link supporting the communication signal 322 may perform a receiving function and/or storing function. The receive signal at 362 may access the signal from the communication link. While the thread 135-x is performing specific types of processing, the thread 1350-x may be in an uninterruptible state at 364. Several types of processing that may be associated with an uninterruptible state include accessing a shared resource using semaphores (for example, to prevent data corruption), memory allocation, memory deallocation, input/output, and any combination. A number of design considerations may also be taken into account with the use of an uninterruptible state at 363. Preferably, processing should be completed before leaving an uninterruptible state 364, because interrupting a given thread may be very expensive, such as for example, without limitation, in terms of the additional computer processing instructions corresponding with context switching.

Preferably, the thread 1350-x is in an interruptible state at 363 then receiving the communication signal 322. Two example functions that may place the thread 1350-x in an interruptible state may include a so-called wait() function, and a so-called wait_for_interrupt_with_file_descriptor() function.

The so-called wait() function may be part of computer program interface and may be used by the thread 1350-x. The so-called wait_for_interrupt_with_file_descriptor() function is preferably used by servers and webservers, and corresponds with waiting for either a timeout or data from an incoming data source such as one or more communication channels identified by the file descriptor. Both functions work in a similar way, they typically wait for the given amount of time or the occurrence of an event, such as the lapse of the timeout period and/or receiving data. Other events may of course be used. Both a wait () and a wait_for_interrupt_with_file_descriptor() function may wait for a communication signal 332 to be received from the communication link 321 for a given period of time. Any of a variety of other implementations are also known.

According to another embodiment, when the thread 1350-x receives the signal 332 from a communication link 321 then the wait state may be interrupted. The thread 1350-x may then compare the received signal corresponding to the communication signal 322, which was received using the communication link 321 with the set of registered signals 335. If the received signal matches a signal code 331 in the set 335 then the corresponding function 332 in the set of functions 336 is processed. Preferably, the function 332 is processed within the regular context 302. In one implementation, a given signal 331 may be identified as an index into the set of signals 335 with the corresponding function 332 being identified using the same index into the set of functions 336.

According to one embodiment of the present invention, a signal handler 310-x and/or signal 322 may be coupled with supporting information. Several examples of supporting information by way of illustration and not by way of limitation includes: a pointer, an argument, a pointer to a run-time context, storage information, architectural information, socket information, registered signals, signal handle information, native handle information, and/or any combination thereof. Each of which will be discussed in turn.

Any of a variety of pointers may be used in the implementation of a signal handler. According to one embodiment of the present invention, a pointer to a function may be used to execute the function within the same thread 1350-x as the signal handler 310-x. Pointers may also be included with the signal 322 and/or 324.

Any of a variety of arguments may be included with the signal 322 and/or 324. The arguments may be used according to one embodiment of the present invention to pass functions and/or function identifiers to be processed as part of processing the signal.

A pointer to a context 301, 302 may be coupled with a thread 1350-x, and/or a signal handler 310-x that originates or forwards a signal 322, 324. An example of the implementation is provided by a Teja specific example of a so-called Teja Run Time Context transmit (tejaRTCtx) pointer. This is a pointer that may be used to identify the registered signals and threads corresponding function 332. According to one implementation of the present invention, a pointer may identify whether the sending thread 1350-x is coupled with a scheduler. If the sending thread is coupled with a scheduler then the pointer may identify the sending thread and/or the scheduler. If the sending thread is not coupled with a scheduler, then the pointer may contain a null value. According to another embodiment of the present invention, a pointer may identify a specific types of threads 1350-x, such as for example a thread coupled with a server, a client, and a webserver.

Storage information may also be included with the signal 322, such as for example to identify where information is stored. According to one embodiment of the present invention, the storage information is related to the processing of a particular signal 322. According to another embodiment, error information may be identified with a specific error identifier and/or specific error number that may correlate with storage information.

Further, the hardware utilized by various computer systems 1300-x and/or the router 1302 may be different. For example, one computer system 1300-1 may include a CPU that requires a so-called "BIGendian" integer representation where the most significant byte is listed first. The other computer system 1300-3 may include a CPU that requires a so-called "LITTLEendian" representation where the least significant byte is listed first. Data structures cannot be passed effectively between these two machines without reciprocal knowledge of each system.

Computer system architecture information may also be coupled with the signal 322 to identify the specific computer system architecture that may correspond with a given thread 1350-x. According to one embodiment, architectural information may include identifying bit, byte, and/or word ordering corresponding with a given computer system architecture. Any of a variety of other architectural information may also be useful, such as for example an Endian flag that may identify the architecture corresponding with the sender thread 1350-x. The Endian flag may indicate a BIGendian architecture or a LITTLEendian architecture. A signal may originate from a thread 1350-x coupled with the BIGendian architecture that is be sent to a thread 1350-1 coupled with a LITTLEendian architecture. Accordingly, the architectural information may be used to support interpreting and/or processing the signal 322.

Socket signal information may be included with the signal 322, and/or the signal handler 310-x. Socket signal information may identify and/or define an implementation of one or more communication channels that may be used when sending and/or receiving information. Any of a variety of other implementations to support communication between threads may also be used according to the present invention.

Signal codes may be included with the signal 322, and/or the signal handler 310-x. Registered signal codes may be coupled with a signal handler 310-x to identify signal codes and the corresponding function that should be performed. According to one embodiment a signal code may be included with the signal 322 for registering or removing the signal code with the signal handler 310-x. According to another embodiment, the signal 322 may include or identify both a signal identifier and/or a corresponding function to be registered with the signal handler 310-x.

Signal handlers 310-x may also include or identify a set of signal codes that were registered. Each signal handler 310-x may be associated with one or more registered signals and/or corresponding functions.

Native operating system handle information may be coupled with the signal 322 to identify an operating system native handle, such as for example to identify a thread 1350-x. The native handle may be specific to each of any of a variety of computer operating system.

As described herein, any of a variety of parameters may be coupled with the signal 332. These parameters may be used to enhance the communication between computer program threads and/or computer programs. Any of a variety of other arguments may also support communication, according to the present invention.

Figure 7:
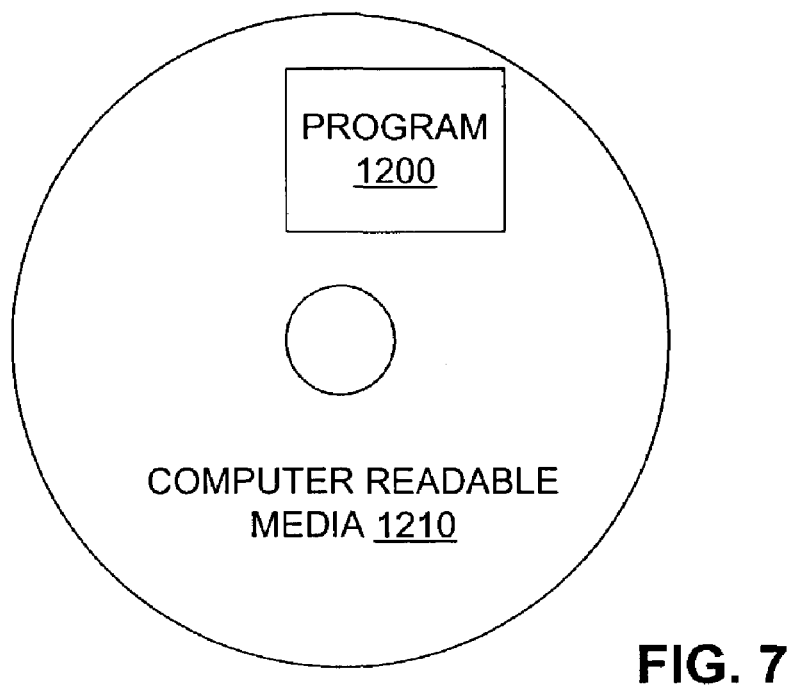
FIG. 7 illustrates an embodiment of a method implemented on a computer readable media, according to an embodiment of the present invention.

FIG. 7 illustrates an exemplary method according to the present invention in the form of a computer program stored or defined on a computer readable media 1210. A computer program 1200 and computer program product represents at least one of the methods described herein, such as for translation processing 450. The computer program 1200 is coupled with or stored in a computer readable media 1210, such that a computer system can read and execute the computer program 1200.

Figure 8:
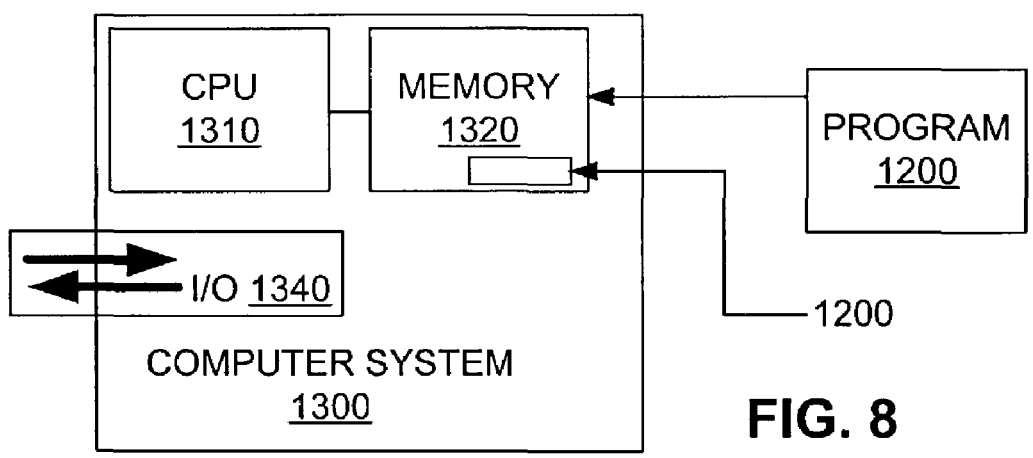
FIG. 8 illustrates an embodiment of a method executed by a computer system, according to an embodiment of the present invention.

FIG. 8 illustrates an exemplary computer system 1300 including at least one processor or central processing unit (CPU) 1310, a memory 1320 coupled to the CPU 1310, and support for input and output 1340. The computer program 1200 may be loaded into a memory 1320 accessible to the computer system 1300, which is capable of executing the computer program 1200. Alternatively, the computer program 1200 may be permanently embedded in the memory 1320. The support for input and output 1340 typically interacts with the computer program 1200.

Advantageously, the present invention enhances performance by supporting communication between threads and/or computer programs thereby providing a more efficient utilization of resources. Further, processing an interrupt is not unnecessarily restricted within a limited context 301. The present invention also supports the scheduling, processing, defining and redefining interrupts that may be performed in synergy with the current state of a given thread 1350-x.

An embodiment of the present invention in capable of providing a number of advantages. One advantage is that faster communication can be achieved through synchronous communication in part because interruption of a thread is not required. Additionally, a signal handler may perform any of a variety of computer program instructions, which may include commonly known blocking codes.

An embodiment of the present invention allows users to convert an asynchronous operating system signal and/or a hardware interrupt into a synchronous interrupt, such as for example without limitation, a Teja synchronous signal. This conversion may result in a number of advantages that will be appreciated by one skilled in the art. A further potential advantage provides that operating system interrupts and/or signals may be used independent of the underlying hardware utilized.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the claims appended hereto and their equivalents.

What is claimed is:

1. A method of synchronous interrupt scheduling to support communication between at least one computer program, including a sending computer program and a receiving computer program, the method including:
   (A) coupling at least one registered signal identifier and a corresponding registered signal function with said receiving computer program;
   (B) sending a communication including a request signal identifier by said sending computer program to said receiving computer program;
   (C) receiving said communication sent at (B) by said receiving computer program; and
   (D) performing said corresponding registered signal function at (A) without context switching of said receiving computer program if said request signal identifier received at (C) is coupled with said registered signal identifier;
   (E) receiving an interrupt by said sending computer program;
   (F) translating said interrupt by said sending computer program into said communication at (B); and
   (G) processing said interrupt by said sending at (B).

2. The method of claim 1, wherein said coupling at (A) comprises:
   (i) receiving at least one registration communication, including a signal identifier and a corresponding function;
   (ii) coupling said signal identifier with a first registered signal identifier selected from said at least one registered signal identifier; and
   (iii) coupling said function with said first registered signal identifier as said corresponding registered signal function.

3. The method of claim 2, wherein said coupling at (A) further comprises:
   (iv) receiving a second registration selected from said at least one registration communication, including a second signal identifier and a corresponding second function;
   (v) identifying said second signal identifier as said first registered signal identifier at (ii); and
   (vi) coupling said second function with said first registered signal identifier as said corresponding registered signal function.

4. The method of claim 2, wherein said coupling at (A) further comprises dynamically updating said corresponding registered signal function.

5. The method of claim 2, wherein said executing said corresponding registered signal function at (D) is performed in a regular context.

6. The method of claim 1, wherein said receiving at (C) further comprises:
   (i) transitioning between a plurality of states selected from a group of states consisting of: an interruptible state and an uninterruptible state;
   (ii) identifying a current selected state from said plurality of states;
   (iii) receiving said communication sent at (B) if said current state is said interruptible state; and
   (iv) delaying said receiving at (iii) if said current state is said uninterruptible.

7. The method of claim 6, wherein said delaying at (iv) further comprises preserving said communication by a communication computer program selected from said at least one computer program coupled between said sending computer program and said receiving computer program.

8. The method of claim 6, wherein said delaying at (iii) includes completing an activity corresponding to said interruptible state before transitioning at (i) to said interruptible state and performing said receiving at (iii) without context switching.

9. The method of claim 6, wherein said transitioning at (i) is performed periodically.

10. The method of claim 9, wherein said performing at (C) is initiated when said receiving computer program periodically switches from said uninterruptible state to said interruptible state.

11. The method of claim 1, wherein (D) comprises:
(i) determining a state of said receiving computer program, said state selected from a group of states consisting of: an interruptible state, and an uninterruptible state;
(ii) determining if said state is said interruptible state then determining if said request signal identifier received at (C) is coupled with said registered signal identifier, then performing said corresponding registered signal function at (A) without context switching of said receiving computer program; and
(iii) if said state is said uninterruptible then delaying said determining at (ii).

12. The method of claim 1, wherein said corresponding registered signal function at (A) includes performing at least one function selected from a group of functions consisting of: a semaphore function, a memory allocation function, a memory deallocation function, an input function, an output function, and a combination of functions thereof.

13. The method of claim 1, wherein said communication at (B) includes at least one attribute selected from a group of attributes consisting of: a pointer attribute, an argument attribute, a pointer to a run-time context attribute, a storage information attribute, an architectural information attribute, a socket information attribute, a registered signals attribute, a signal handle information attribute, a native handle information attribute, and a combination of attributes thereof.

14. The method of claim 1, wherein said interrupt received at (E) is an asynchronous operating system signal, and said processing at (G) is a synchronous signal representative of said asynchronous operating system signal.

15. The method of claim 14, wherein said processing at (G) is operating system independent.

16. The method of claim 15, wherein said performing at (D) corresponding to said processing at (G) is operating system independent.

17. The method of claim 1, wherein said interrupt is selected from a group of interrupts consisting of: an operating system interrupt, a software interrupt, a hardware interrupt, and combinations thereof.

18. The method of claim 1, wherein said sending computer program performs said translating at (F) in a limited context, and said performing at (D) is performed in a normal context.

19. The method of claim 1, wherein said receiving computer program is not interrupted by said interrupt.

20. The method of claim 1, wherein said sending computer program further comprises an interrupt signal handler.

21. A interrupt scheduling system to provide synchronous interrupt scheduling of a communication between at least one computer program, including a sending computer program and a receiving computer program, the system comprising:
a storage structure including a first memory;
a registration manager, coupled to said storage structure and said receiving computer program, to receive and store in said first memory at least one registered signal identifier and a corresponding registered signal function;
a sending manger, coupled to said storage structure and said sending computer program, to send a communication including a request signal identifier by said sending computer program to said receiving computer program;
a receiving manager, coupled to said storage structure and said receiving computer program, to receive said communication sent by said receiving computer program; and
an execution manager, coupled to said storage structure and said receiving computer program, to perform said corresponding registered signal function without context switching of said receiving computer program if said request signal identifier received is coupled with said registered signal identifier;
means for receiving an interrupt by said sending computer program;
means for translating said interrupt by said sending computer program into said communication; and
a processor, coupled with said registration manager, said sending manager, said receiving manager, and said execution manager, to process said interrupt and to provide synchronous interrupt scheduling of communication between said least one computer program.

22. The system of claim 21, wherein said registration manager further comprises:
a receiving function to (i) receive at least one registration communication, including a signal identifier and a corresponding function; to (ii) couple said signal identifier with a first registered signal identifier selected from said at least one registered signal identifier; and to (iii) couple said function with said first registered signal identifier as said corresponding registered signal function.

23. The system of claim 22, wherein said receiving function further comprises:
a update function to (iv) receive a second registration selected from said at least one registration communication, including a second signal identifier and a corresponding second function; to (v) identify said second signal identifier as said first registered signal identifier at (ii); and to (vi) couple said second function with said first registered signal identifier as said corresponding registered signal function.

24. The system of claim 23, wherein said execution manager further comprises:
a state function to (i) transition between a plurality of states selected from a group of states consisting of: an interruptible state and an uninterruptible state; to (ii) identify a current selected state from said plurality of states; to (iii) receive said communication if said current state is said interruptible state; and to (iv) delay said receiving at (iii) if said current state is said uninterruptible.

25. A interrupt scheduling system for providing synchronous interrupt scheduling of a communication between at least one computer program, including a sending computer program and a receiving computer program the system comprising:
means for storing a storage structure including a first memory;
means for registering, coupled to said storage structure and said receiving computer program, for receiving and storing in said first memory at least one registered signal identifier and a corresponding registered signal function with said receiving computer program;

means for sending, coupled to said storage structure and said sending computer program, for sending a communication including a request signal identifier by said sending computer program;

means for receiving, coupled to said storage structure and said receiving computer program, for receiving said communication sent by said means for sending; and means for performing, coupled to said storage structure and said receiving computer program, for performing said corresponding registered signal function without context switching of said receiving computer program if said request signal identifier received is coupled with said registered signal identifier;

processor means coupled with said means for registering, said means for sending, said means for receiving, and said means for executing for providing synchronous interrupt scheduling of communication between said least one computer program;

means for receiving an interrupt by said sending computer program;

means for translating said interrupt by said sending computer program into said communication; and means for processing said interrupt by said means for sending.

26. A computer-readable medium encoded with a computer program code for providing synchronous interrupt scheduling of a communication, the program code causing a computer to execute a method comprising:

(A) coupling at least one registered signal identifier and a corresponding registered signal function with said receiving computer program;

(B) sending a communication including a request signal identifier by said sending computer program to said receiving computer program;

(C) receiving said communication sent at (B) by said receiving computer program; and (D) performing said corresponding registered signal function at (A) without context switching of said receiving computer program if said request signal identifier received at (C) is coupled with said registered signal identifier;

(E) receiving an interrupt by said sending computer program;

(F) translating said interrupt by said sending computer program into said communication at (B); and (G) processing said interrupt by said sending at (B).

27. A computer system comprising:

a computer-readable medium encoded with a computer program code for providing synchronous interrupt scheduling of a communication, the program code causing a computer to execute a method comprising:

(A) coupling at least one registered signal identifier and a corresponding registered signal function with said receiving computer program;

(B) sending a communication including a request signal identifier by said sending computer program to said receiving computer program;

(C) receiving said communication sent at (B) by said receiving computer program; and (D) performing said corresponding registered signal function at (A) without context switching of said receiving computer program if said request signal identifier received at (C) is coupled with said registered signal identifier;

(E) receiving an interrupt by said sending computer program;

(F) translating said interrupt by said sending computer program into said communication at (B): and (G) processing said interrupt by said sending at (B): and a CPU coupled to said computer-readable medium, for executing said computer program code therein.

28. A router comprising:

a plurality of processors;

an input/output interface coupled with at least one of said plurality processors;

at least one memory coupled with at least one of said plurality of processors;

at least one memory coupled with each of said processors, said at least one memory storing procedures for execution by said processors and data, said data including at least one registered signal identifier and a corresponding registered signal function;

said procedures including:

a coupling procedure for coupling said at least one registered signal identifier and a corresponding registered signal function with a receiving computer program;

a receiving procedure for receiving a communication, including a first request signal identifier selected from said at least one registered signal identifier, and subsequently initiating executing of said corresponding registered signal function without context switching of said receiving procedure;

a sending procedure for sending said communication including said request signal identifier;

a performance procedure for performing said at least one corresponding registered signal function without context switching of said receiving computer program if said received request signal identifier is coupled with said registered signal identifier;

an interrupt receiving procedure for receiving an interrupt by a sending computer program;

a translation procedure for translating said interrupt by said sending computer program into said communication; and a processing procedure for processing said interrupt.

29. The router of claim 28, wherein said receiving procedure further comprises:

(i) transitioning periodically between a plurality of states selected from a group of states consisting of: an interruptible state and an uninterruptible state;

(ii) identifying a current selected state from said plurality of states;

(iii) receiving said communication if said current state is said interruptible state; and (iv) delaying receiving at (iii) if said current state is said uninterruptible.

30. The router of claim 29, wherein said receiving procedure executes said corresponding registered signal function in the normal context of said receiving procedure without context switching.

31. The router of claim 30, wherein said corresponding registered signal function performs at least one function selected from a group of functions consisting of: a semaphore function, a memory allocation function, a memory deallocation function, an input function, an output function, and a combination of functions thereof.

32. A computer program product for use in conjunction with a computer system, the computer program product comprising a computer readable storage medium and a computer program mechanism embedded therein, the computer program mechanism comprising:

a program module that directs computer system components to function in a specified manner including processing to provide synchronous interrupt scheduling of a communication, the program module including instructions for:

(a) coupling at least one registered signal identifier and a corresponding registered signal function with a receiving computer program;

(b) sending a communication including a request signal identifier by a sending computer program to said receiving computer program;

(c) receiving said communication sent at (b) by said receiving computer program;

(d) performing said corresponding registered signal function at (A) without context switching of said receiving computer program if said request signal identifier received at (c) is coupled with said registered signal identifier;

(e) receiving an interrupt by said sending computer program;

(f) translating said interrupt by said sending computer program into said communication at (b); and (g) processing said interrupt by said sending at (b).

33. The computer program product of claim 32, wherein said coupling at (a) further comprises dynamically receiving a second function and a second signal identifier, corresponding to a second registered signal identifier selected from said at least one registered signal identifier, and using said second function for redefining said registered signal function corresponding to said second registered signal identifier.

* * * * *